May 4, 1926.
G. J. WALKER ET AL
BORE TESTING DEVICE
Filed Jan. 21, 1922
1,583,208
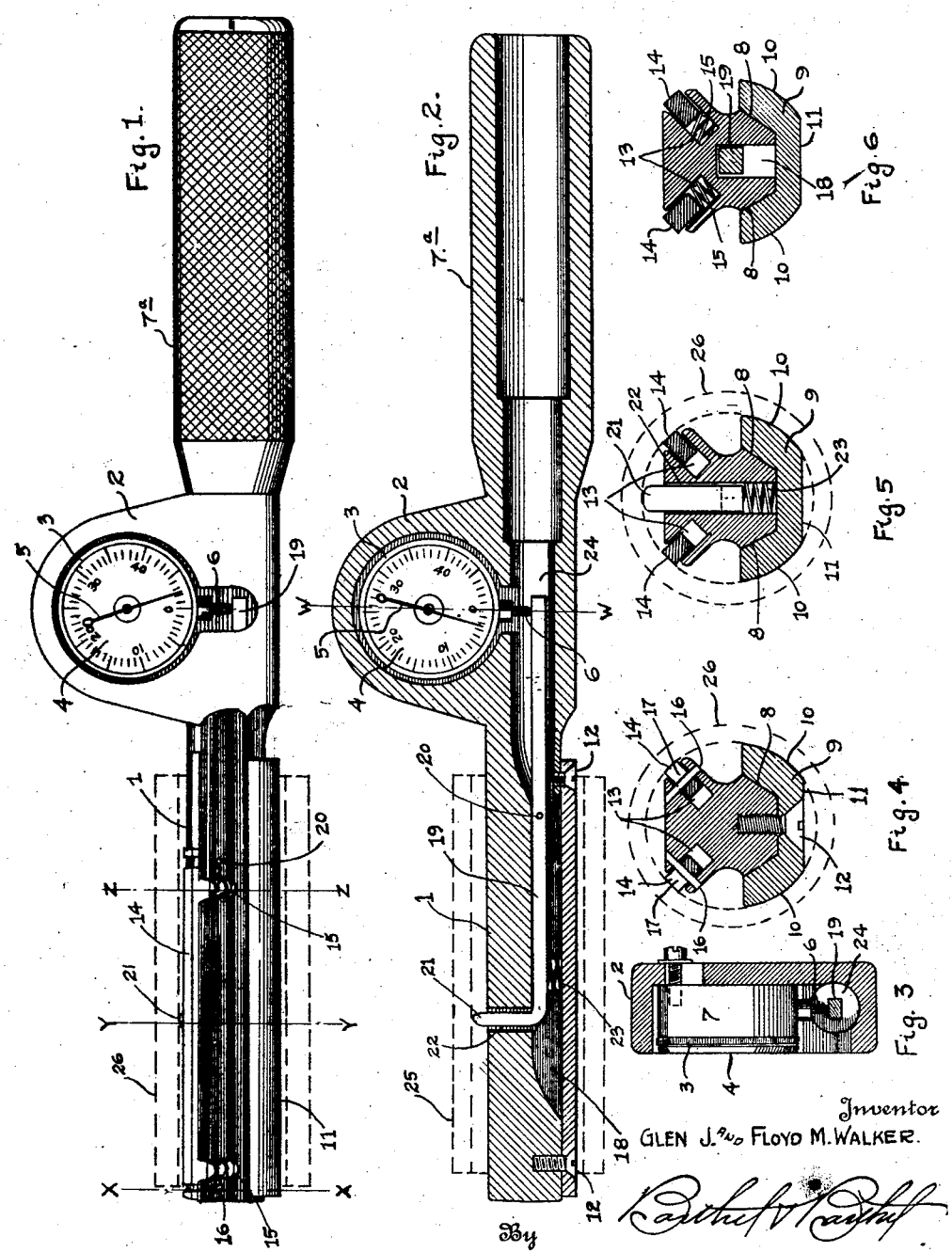
Inventor
GLEN J. and FLOYD M. WALKER.
Attorneys Patented May 4, 1926.

1,583,208

UNITED STATES PATENT OFFICE.

GLEN J. WALKER, OF INDIANAPOLIS, INDIANA, AND FLOYD M. WALKER, OF DETROIT, MICHIGAN, ASSIGNORS TO ADVANCE PATTERN AND PRODUCTION COMPANY, OF DETROIT, MICHIGAN, A CORPORATION OF MICHIGAN.

BORE-TESTING DEVICE.

Application filed January 21, 1922. Serial No. 530,811.

*To all whom it may concern:*

Be it known that we, GLEN J. WALKER and FLOYD M. WALKER, citizens of the United States of America, residing at Indianapolis, in the county of Marion and State of Indiana, and at Detroit, in the county of Wayne and State of Michigan, respectively, have invented certain new and useful Improvements in Bore-Testing Devices, of which the following is a specification, reference being had therein to the accompanying drawings.

Where great accuracy and precision are required in the forming of holes or bores in various devices, machine parts, etc., such as cylinder bores and the like, it is the common practice to provide accurately formed plug gauges which may be inserted in the bore, but such gauges do not show all inaccuracies throughout the length of the bore or in its diameter, and further a separate gauge is necessary for each size of bore. The object of this invention is to provide a gauge of simple construction which may be readily manipulated and may be used to test a wide range of sizes of bores, including those of a comparatively small diameter and will indicate to the operator at a glance all inaccuracies, or high or low spots, throughout the length or circumference of the bores. A further object is to provide a direct reading gauge wherein the dial is so located relative to the body of the gauge which is inserted in the bore, that bores of smaller diameter may be tested and the indicating dial will always be in plain view of the operator.

It is also an object of the invention to provide a gauge which is very accurate in its indication and which will show the slightest variation or inaccuracy in the bore and the amount of such variation.

A further object is to provide a device for the purpose which is simple in construction and has certain other new and useful features, all as hereinafter more fully described.

With the above and other ends in view the invention consists in providing a body adapted to be inserted in a bore and which carries indicating means positioned outside of the portion of the body to be inserted in the bore, and is also provided with means for accurately positioning and holding the body within the bore.

The invention further consists in providing certain novel features in its construction and arrangement of parts all as hereinafter more fully described and particularly pointed out in the appended claims, reference being had to the accompanying drawing, in which—

Figure 1 is a side elevation of a gauge illustrative of the invention;

Fig. 2 is a longitudinal section through the same, and

Figs. 3, 4, 5 and 6 are transverse sections substantially upon the lines X, Y and Z respectively, of Fig. 1.

As shown in the drawing, the gauge illustrative of the invention comprises a body portion 1 of any suitable form in cross section and of a size suited to the bore to be tested so that it may be readily slipped into the bore, and formed integral with one end of this body is a casing 2 to receive a direct reading gauge 3 of any old and well known construction, but preferably a gauge having a dial 4 with an indicating hand 5 to move over the dial and a testing finger 6 projecting laterally from one side of the dial casing 7 within which suitable mechanism (not shown) is contained for transmitting motion from the test finger to the index hand. Applied to or formed integral with the side of the casing 2 opposite that from which the body 1 projects, is a suitable handle 7ª by means of which the instrument may be conveniently handled and manipulated.

The body 1 is formed at one side with a plurality of longitudinally extending facets 8 arranged in angular relation to each other and forming a seat for a bearing member 9 formed at its inner side to conform to the facets and with curved bearing faces 10 on its outer side, said bearing faces being curved transversely of the member and approximating in their curvature, the inner surface of the bore into which the body is to be inserted. The bearing member 9 intermediate its bearing surface 10 is flattened as at 11 to clear the inner surface of the bore and said member is detachably secured to the body by means of screws 12 passing through openings adjacent the ends of the flattened portion 11 and engaging screw-threaded holes in the body.

At the side of the body opposite that upon which the bearing member 9 is secured, said body is formed with a pair of longitudinal grooves 13 which grooves extend radially inward from the outer face of the body and are adapted to receive bars 14 each of which is normally held projected from the grooves or slots by means of springs 15, one adjacent each end of the bar and seated within sockets in the body to engage the inner sides of the bars. These bars 14 thus form yieldable guide members or shoes to engage the inner surface of a bore to which a gauge is applied and at points substantially diametrically opposite the contact surfaces 10 of the bearing member 9. To hold the bars 14 within their grooves 13, pins 16 extend through holes in the body and through slots 17 in the bars. These pins thus limit the outward movement of the bars and the slots permit of a free inward movement of the bars against the action of the springs 15. These yieldable guide shoes or bars 14 thus exert a pressure against the inner surface of the bore to which the gauge is applied to force the body 1 laterally therein and bring the contact surfaces 10 into firm contact with the surface of the bore. The body is therefore accurately positioned and held within the bore which is being tested and four places or lines of contact with the surface of the bore is provided by the surfaces 10 and the outer edges of the bars 14. When inserted in a bore, the body is therefore held against tilting but may be readily moved longitudinally in the bore or turned therein.

Within a longitudinal slot 18 formed in the side of the body 1 beneath the bearing member 9, is a lever 19 which is pivoted intermediate its ends at 20 and has a laterally extending end portion 21 extending through a transverse hole 22 in the body and forming a contact finger to engage the surface of the bore being tested. The contact finger 21 extends laterally from the side of the body mid-way between the yielding contact bars or shoes 14 and this lever 19 is rocked upon its pivot and its contact finger 21 normally held projected to the limit of its movement by a coiled spring 23 positioned within a bore in the body with one end seating upon the member 9 and the other end engaging the lower side of the lever 19.

The end of the lever 19 opposite that which is provided with the finger 21, extends into a longitudinal hole 24 provided in the lower part of the casing 2, with the free end of the lever directly beneath the reading gauge 3 with the test finger of said gauge contacting said end of the bar.

When it is desired to determine the accuracy of the bore of any member such as indicated in dotted lines at 25 in Fig. 2, the body 1 is inserted endwise into the bore and is accurately positioned therein by the bearing member 9 and contact shoes 14. The contact finger 21 engages the inner surface of the bore and being pressed inward thereby rocks the lever 19 on its pivot which operates the test finger 6 and the amount of movement or size of the bore at that particular point is indicated upon the dial 4. By inserting the body into a test ring indicated in dotted lines at 26 in Fig. 1, prior to its insertion in the bore, the reading gauge may be set so that its hand will indicate zero, thus indicating that the bore of the test ring is the exact size required for the bore to be tested and then by inserting the body within the bore to be tested, any inaccuracies and the exact amount thereof will be indicated on the dial by the deflection of the indicating hand from the zero point. By means of the handle 7 the body may be moved longitudinally within the bore thus bringing the finger 21 in contact with any portion thereof throughout its length and the device may also be turned within the bore so that any inaccuracies in the diameter thereof will be indicated on the dial.

In the present construction, the dial is so located relative to that portion of the instrument which is to be inserted in the bore, that said dial will always be outside of the bore where it can be readily observed and further the body 1 may be made of comparatively small diameter so that bores of comparatively small diameter may be tested. When bores of larger diameter are to be tested the body may be made of greater diameter and bores of a comparatively wide range of difference in diameter may be tested by the same instrument which is used in testing smaller bores, by substituting for the contact member 10 another contact member of greater thickness and whose curved surfaces have a radius which more nearly corresponds to the radius of the bore to be tested.

It is obvious that the body 1 may be made of any suitable length to provide for the testing of bores of extended length, and other changes in the construction and arrangement of parts may be made within the scope of the appended claims without departing from the spirit of the invention. We do not therefore limit ourselves to the particular construction, form or arrangement shown.

What we claim is:—

1. A device for testing the accuracy of bores and the like, comprising an elongated body adapted to be inserted endwise in a bore, operating means extending longitudinally of the body, with one end arranged to engage the wall of the bore, yielding means for engaging the wall of the bore and movably supported by the body to yield inwardly thereof, said means extending throughout the length of the portion of the body to be inserted in a bore, and indicating means actuated by said operating means, said indicating means being carried by the body outside of said bore when said body is inserted in the bore.

2. A device for testing the accuracy of bores and the like, comprising an elongated body adapted to be inserted endwise in a bore and having a longitudinally extending bearing member to engage the wall of the bore at one side of the body, a yieldable member carried by the body at the side thereof opposite the bearing member to yieldingly engage the wall of the bore and center and guide the body therein, operating means within the body extending longitudinally thereof and projecting beyond the portion of the body which is adapted to be inserted in a bore, said means also projecting laterally at one end from the side of the body to engage the wall of the bore, and indicating means carried by the body beyond that portion of the body adapted to be inserted in a bore and actuated by the end portion of the operating means which extends beyond the portion of the body adapted to be inserted in the bore, said indicating means being positioned outside of the bore when the body is inserted therein.

3. In a device of the character described, the combination of an elongated body adapted to be inserted endwise in a bore, yieldable means carried by the body and movable inwardly thereof and extending longitudinally of the body throughout the length of that portion of the body which is adapted to be inserted in a bore, a pivoted member within the body extending longitudinally thereof with one end projecting beyond the end portion of the body which is adapted to be inserted in a bore and the opposite end of which member is adapted to engage a wall of the bore, and indicating means carried by the body beyond that portion of the body which is adapted to be inserted in a bore, said indicating means being operated by the projecting end of said pivoted member.

4. In a device of the character described, the combination of an elongated carrying member adapted to be inserted endwise in a bore, a detachable bearing member detachably secured to one side of said carrying member, means at the opposite side of said carrying member for yieldingly engaging the wall of the bore to yieldingly hold the bearing member in contact with the wall of the bore, a finger carried by the carrying member to engage the wall of the bore, means within the carrying member extending beyond the outer end of that portion of the carrying member which is adapted to be inserted in a bore and to transmit motion from the finger, and means on the outer end of the carrying member beyond that portion thereof which is adapted to be inserted in a bore, to indicate by the movement of said finger, inaccuracies in the wall of the bore.

5. A device of the character described comprising an elongated body adapted to be inserted endwise in a bore, a motion transmitting member extending longitudinally of said body and pivoted intermediate its ends therein, said member having an end to engage the wall of the bore and an end portion extending through the outer end portion of the body which is adapted to be inserted in a bore, and an indicating device at the outer end of the body beyond the portion of the body to be inserted in the bore and operated by movement of said end of said member which extends through the outer end portion of the body which is inserted in the bore.

6. A device of the character described comprising an elongated body portion adapted to be inserted endwise in a bore, a casing portion at the outer end of said body portion, and a handle portion beyond said casing and extending longitudinally of the body, a motion transmitting member extending longitudinally within the body and adapted to engage the wall of the bore at one end and projecting beyond that portion of the body which is inserted in the bore with an end adjacent said casing, radially yieldable guide members extending longitudinally of the portion of the body insertible in the bore, and an indicator within the casing operated by the engagement therewith of the end portion of the motion transmitting member which extends beyond the portion of the body insertible in the bore.

7. In a device of the character described, the combination of an elongated body adapted to be inserted endwise in a bore, a bearing member detachably secured to one side of the body and extending longitudinally thereof, radially yieldable means at the opposite side of the body extending longitudinally thereof throughout the length of the portion of the body insertible in the bore and adapted to engage the wall of the bore and center the body in the bore, a motion transmitting member pivoted intermediate its ends within the body and extending longitudinally thereof with one end of said member projecting beyond the portion of the body to be inserted in a bore and its opposite end formed to engage the wall of the bore, a casing on the outer end of the body beyond the portion thereof adapted to be inserted in the bore, an indicator in the casing operated by the projecting end of said motion transmitting member, and a handle extending longitudinally of the body beyond the casing.

In testimony whereof we affix our signatures.

GLEN J. WALKER.
FLOYD M. WALKER.